Dec. 29, 1970  J. SACREZ ET AL  3,551,126
METHOD AND APPARATUS FOR MANUFACTURING FLAT GLASS
Filed Feb. 28, 1967  2 Sheets-Sheet 1

INVENTORS:
Jules Sacrez
Gustave Javaux
Gilbert Doquire
Marcel Bodart
BY Spencer & Kaye
ATTORNEYS INVENTORS:
Jules Sacrez
Gustave Javaux
Gilbert Doquire
Marcel Bodart BY Spencer & Kaye
ATTORNEYS United States Patent Office 3,551,126
Patented Dec. 29, 1970

3,551,126
METHOD AND APPARATUS FOR MANU-
FACTURING FLAT GLASS
Jules Sacrez, Jumet, Gustave Javaux, Brussels, Gilbert
Doquire, Spy, and Marcel Bodart, Namur, Belgium,
assignors to Glaverbel S.A., Brussels, Belgium
Filed Feb. 28, 1967, Ser. No. 619,328
Claims priority, application Luxembourg, Mar. 14, 1966,
50,648
Int. Cl. C03b 18/02
U.S. Cl. 65—27                                    4 Claims

ABSTRACT OF THE DISCLOSURE

Flat glass is manufactured by the float process on a molten metal bath above which substantially all of an atmosphere of protective gas is introduced at the cooler downstream end of the bath and withdrawn at the hotter upstream end of the bath. The flow of protective gas from the cooler to the hotter end of the bath removes vaporized metal compounds which would otherwise condense and be deposited as contaminants on the surface of the glass.

BACKGROUND OF THE INVENTION

In the so-called "float" process of making flat glass, a ribbon of glass in molten or plastic condition is moved along a bath of molten metal in a covered tank and progressively cooled to a condition in which the ribbon can be advanced by mechanical conveying means. It is necessary to maintain a protective atmosphere above the bath of molten metal to prevent the formation of contaminants on the glass by reaction between the molten metal and elements such as molecular oxygen present in the ambient air, and to this end, it is the practice to keep the space in the tank above the bath of molten metal filled with a mixture of gases which, under the prevailing conditions, are substantially chemically inert with respect to the molten metal.

Notwithstanding the presence of the protecting atmosphere, the glass may become contaminated as a result of small quantities of impurities present or forming in the bath, and it has been proposed to avoid contamination from such impurities by injecting into the bath gases which are inert to the molten metal to cause such impurities to be carried off in vaporized condition. The places at which such gas injection takes place must, of course, be located so that the gas rises into the tank atmosphere clear of the glass.

Even when the foregoing precautions are observed, evidence of surface damage to the glass by contaminants has occasionally been observed, and it is the object of this invention to provide a method and apparatus for preventing such contamination.

SUMMARY OF THE INVENTION

In accordance with this invention, it has been found that the risk of damage due to contamination of the glass can be substantially eliminated by introducing all or the greater part of the protective gas into the tank at its cooler end portion and causing such gas continuously to flow away from the cooler end portion and to leave the tank from the hotter end portion thereof.

Accordingly, the present invention comprises a method wherein flat glass is formed on a bath of molten metal in a tank through which the glass is advanced and cooled and in which the space above the molten bath is kept filled with a protective gas; and wherein all or at least the greater part of such gas is introduced into the tank at its cooler end portion and caused continuously to flow away from the cooler end portion and to leave the tank from the hotter end portion thereof.

In the foregoing definition, and hereafter in this specification, the expression "protective gas" means a single gas or a mixture of gases which is or are substantially chemically inert with respect to the molten metal constituting the bath. The expressions "cooler end portion" and "hotter end portion" respectively denote the portions of the tank lying on the downstream and upstream sides of a plane dividing the tank transversely midway between its ends.

The contamination of the glass previously encountered as hereinbefore described appears to be indirectly attributable to the somewhat random flow protective gas in the tank, in consequence of which vaporized metal compounds forming from traces of active elements in the tank atmosphere become condensed on surfaces in the cooler end portion of the tank, where they are subject to reduction by the action of hydrogen or other reducing components in the protective gas, with consequent formation of metal particles which fall onto the glass ribbon. Whatever be the true reason, the establishment of a positive current of the protective gas away from the cooler end portion of the tank has been found to give improved results.

The invention also includes apparatus for producing the above-noted flow of protective gas.

DESCRIPTION OF THE PREFERRED EMBODIMENTS

Figure 1:
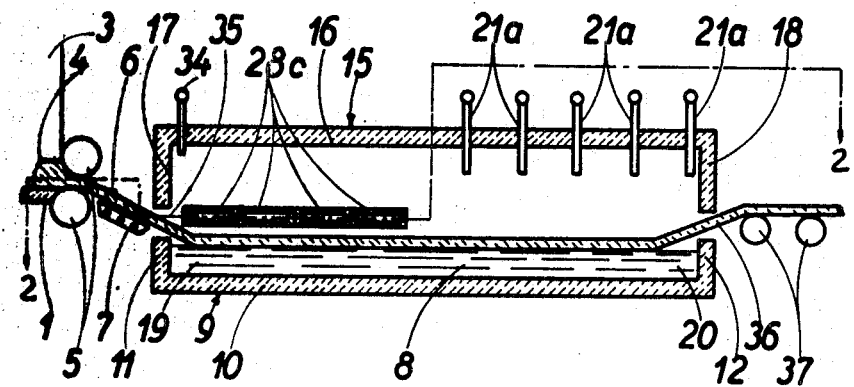
FIG. 1 is a vertical cross-sectional view of one illustrative embodiment of the invention.

Before discussing the above noted embodiments of the invention in detail, the general principles of the invention will first be discussed.

The flow of protective gas in a continuous stream from the cooler to the hotter end portion of the tank prevents potentially harmful metal compounds which may form in the higher temperature zones of the tank from being carried in the tank atmosphere to the cooler zones, and any such compounds will, at least for the greater part, be rapidly carried out of the tank by the gas. In addition, the flow of protective gas in the tank accelerates the cooling of the glass during its movement through the tank. By regulating such flow of protective gas, it is possible progressively to cool the glass according to a predetermined schedule more easily and satisfactorily than by means of water-cooled devices in the tank, and while such devices may be employed when carrying out the invention, it is better to rely wholly or mainly on the cooling action of the protective gas.

It is clearly desirable to aim at a fairly rapid flow of the protective gas in the tank, with a view to shortening the residence time of impurities in the tank atmosphere. Provided the gas entering the tank is appropriately directed, and the flow resistance offered by the gas outlet opening in the hotter end portion of the tank is sufficiently low in relation to the resistance to out-flow of gas offered by the glass exit opening, the required flow in the tank may be established merely by forcing the protective gas into the cooler end portion of the tank at a sufficient rate, e.g., with one or more fans or compressors. Alternatively, the required gas flow in the tank can be maintained by one or more fans or other devices which draw off protective gas from the hotter end portion of the tank. Such fans can also be used in conjunction with additional means for forcing gas into the cooler end portion of the tank. In any case, the system can be controlled so that the gas pressure prevailing in the hotter end portion of the tank is kept appreciably below the pressure in the other end portion of the tank but nevertheless above atmospheric pressure.

A proportion of the total amount of protective gas supplied to the tank may be discharged continuously to atmosphere through the glass entry and exit openings so as thereby to exclude the entry of air through these openings in accordance with known practice. It will accordingly be understood that it is not necessary for all of the protective gas supplied to the tank to flow towards its hotter end; on the contrary, some protective gas is advantageously discharged from the tank through the glass exit opening at the cooler end of the tank.

The invention also includes apparatus for carrying out the new process. Such apparatus comprises a covered tank for holding the bath of molten metal to support a ribbon of glass during the manufacture of flat glass by the float process, and means for keeping the tank space above the molten metal bath entirely filled with protective gas and for keeping the whole or major part of the protective gas present in the tank at any given time in flow away from the cooler end of the tank.

For continuous flow of protective gas away from the cooler end of the tank to take place, there must be one or more feed passages leading the protective gas into the cooler end portion of the tank and one or more outlets for the protective gas in the hotter end portion of the tank.

The protective gas may be forced into the tank through one or more pipes opening endwise into the tank through its top and/or upper side walls. Alternatively, one or more gas supply conduits with peripheral gas discharge orifices may extend transversely across the interior of the tank above the molten bath. One or more pipes opening endwise into the tank or one or more apertured conduits extending transversely across the tank interior may also be employed at the hotter end portion of the tank for conducting protective gas out of the tank.

The direction in which the protective gas is discharged into the tank is open to choice but it is usually undesirable for jets of protective gas to impinge directly on the glass. It is particularly suitable in such cases to discharge the gas from one or more conduits extending laterally across the interior of the tank and having gas discharge orifices which discharge the gas substantially horizontally. The major proportion of the gas will preferably be discharged in the direction of the hotter end of the tank so that this gas does not have to undergo a change of flow direction in the tank; however, a proportion of the gas discharged into the tank near its cooler end can advantageously be discharged in the other direction and through the glass exit opening.

The outlet or outlets for gas from the hotter end portion of the tank may be placed so that the gas leaving through these outlets derives, at least for the greater part, from certain selected places inside the tank. For instance, the gas outlets may be arranged for drawing off gas primarily from places above the side marginal portions of the bath where the molten metal is not covered by the glass ribbon.

Figure 2:
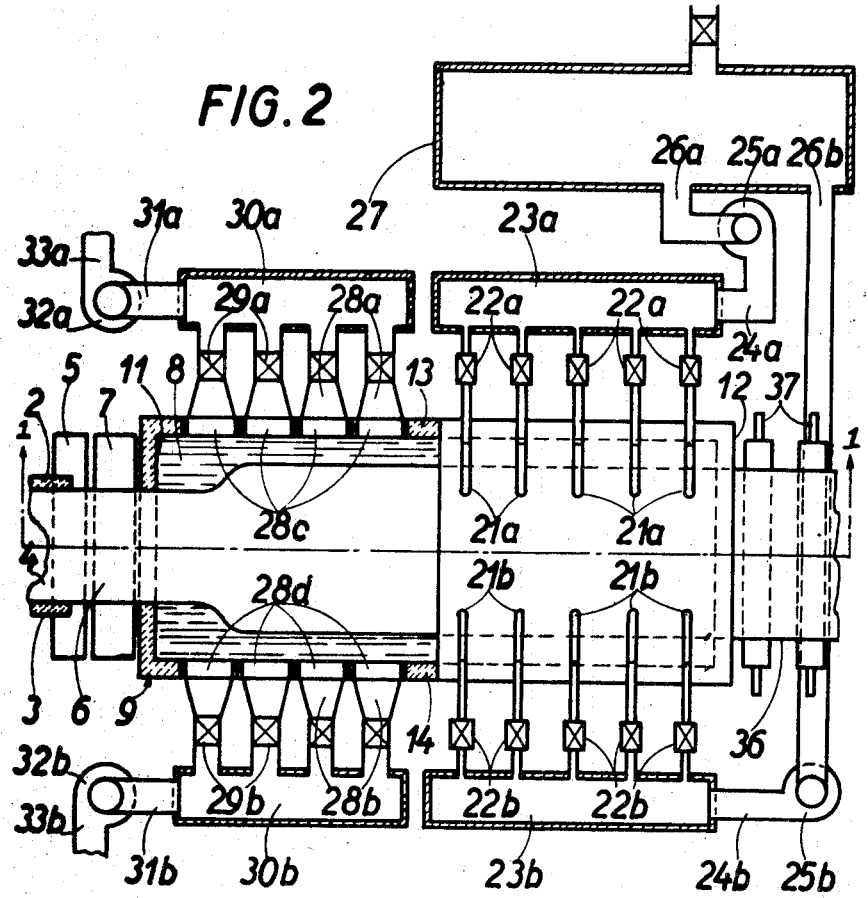
FIG. 2 is a plan view partially in horizontal cross section taken substantially along the planes defined by reference line 2—2 in FIG. 1 showing associated parts of the protective gas supply and discharge apparatus.

In FIGS. 1 and 2, a glass-melting tank furnace is represented by its bottom 1 and its side walls 2, 3 which channel molten glass 4 between casting rollers 5. The glass ribbon 6 emerging from the casting rollers is supported by an inclined table 7 and passes onto a bath 8 of molten metal in a tank 9. The tank 9 comprises a tank bottom 10, an upstream end wall 11, a downstream end wall 12, and side walls 13, 14, and has a roof structure 15 comprising a top 16, an upstream end wall 17 and a downstream end wall 18.

Inside the tank 9, heating means (not shown) maintains a hot zone 19 at the upstream end of the tank. The temperature decreases along the tank towards the downstream end, i.e., towards the cool zone 20. When the molten metal used is molten tin, the temperature gradient is, say, from 1000° C. near the upstream end wall 11, to 600° C. near the downstream end wall 12.

Above the surface of the bath 8 of metal at the cooler end portion of the tank there are two groups of five pipes 21a, 21b which extend through the top 16 adjacent the side walls 13 and 14 respectively, and open into the tank interior. The pipes 21a, 21b, which have valves 22a, 22b, are connected to distributors 23a, 23b, respectively. Delivery pipes 24a, 24b connect these distributors to blowing fans 25a, 25b and the intake pipes 26a, 26b of the fans are connected to a reservoir 27 containing protective gas. The protective gas normally includes a very high percentage of nitrogen and a very low percentage of hydrogen, a typical example being a gas composed of 95% nitrogen and 5% hydrogen.

Above the surface of the bath 8 of metal at the hotter end portion of the tank are two groups of four pipes 28a, 28b which extend through the side walls 13 and 14 respectively, so that the ends 28c, 28d of these pipes also open into the tank interior. These pipes 28a, 28b have valves 29a, 29b and their outer ends are connected to collectors 30a, 30b which are connected to intake pipes 31a, 31b leading to suction fans 32a, 32b the delivery pipes 33a, 33b of which discharge into the atmosphere.

Above the surface of the bath 8 of metal at the hotter end portion of the tank there is also a pipe 34 through which protective gas can be introduced into the tank in the immediate vicinity of the glass entry slot 35.

At the exit end of the tank the sheet glass 36 is lifted off the bath of molten metal and conveyed by rollers 37 to an annealing lehr (not shown).

The apparatus operates as follows: When the selected metal, for instance, tin, is being melted in the tank 9 to produce the bath 8 of molten metal comprising the cool zone 20 and the hot zone 19, the two fans 25a, 25b are switched on and these fans draw protective gas from the supply reservoir 27, and force the gas at low pressure through the delivery pipes 24a, 24b and into the distributors 23a, 23b. The protective gas discharges from the distributors and into the tank via pipes 21a, 21b, in quantities which are determined by the setting of valves 22a, 22b. Relatively larger amounts of the protective gas are discharged into the tank via the pipes 21a, 21b which are nearest the downstream end wall 18 so as to prevent any entry of ambient air through the glass exit slot. As the protective gas leaves the pipes 21a, 21b and enters the tank, the slightly compressed gas expands and it continues to expand as it moves towards the hotter end portion of the tank.

The movement of the protective gas towards the hotter end portion of the tank is greatly facilitated by the maintenance in that portion of the tank of a lesser degree of positive pressure than that which prevails in the cooler end portion of the tank under the action of the two suction fans 32a, 32b. These fans continuously draw off protective gas from the tank interior and discharge this gas to atmosphere, the withdrawal rate through the different pipes 28a, 28b being controlled by valves 29a, 29b. Sufficient protective gas is discharged into the tank at its hotter end, through pipe 34, to prevent ambient air from entering the tank through the glass entry slot 35.

The positive flow of protective gas through the tank ensures that a large amount of the vaporized metal compounds forming in the tank are rapidly discharged to atmosphere so that they are not allowed to contaminate the glass. In particular, vaporized metal compounds are prevented from flowing from the hotter to the cooler ends of the tank where they would be liable to condense and become reduced with consequent formation of substances which contaminate the glass downstream of the hot zone. The protective gas flow also contributes to a certain extent to a more gradual and uniform cooling of the surface areas of the molten glass layer.

Figure 3:
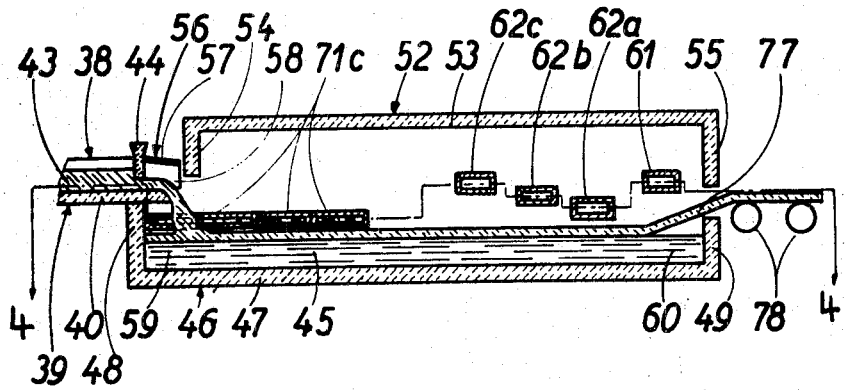
FIG. 3 is a vertical cross-sectional view of another embodiment of the invention.
Figure 4:
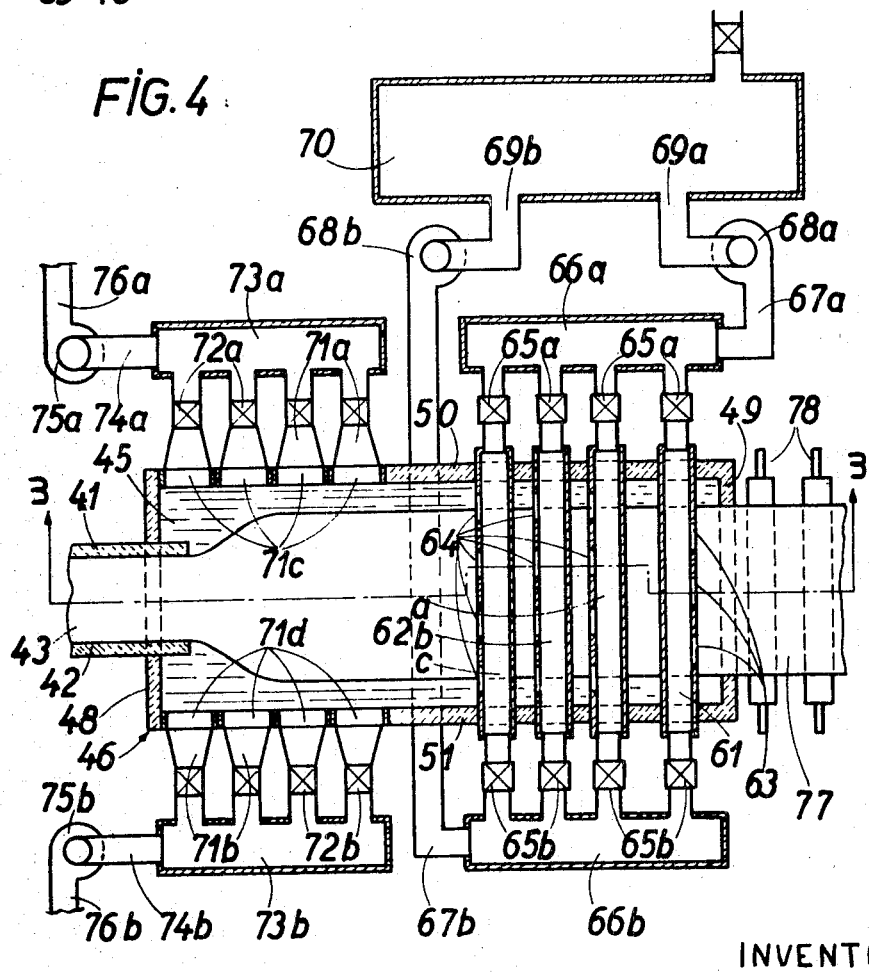
FIG. 4 is a plan view partially in horizontal cross section taken substantially along the planes defined by reference line 4—4 in FIG. 3 showing associated parts of the protective gas supply and discharge means.

Referring now to the second embodiment of the invention, illustrated in FIGS. 3 and 4, a glass-melting tank furnace 38 is represented merely by the downstream end of its casting system 39, comprising bottom wall 40 and side walls 41, 42, which channels molten glass 43 via flow-regulating barrier 44 onto a bath 45 of molten metal in a tank 46. The tank 46 comprises a tank bottom 47, an upstream end wall 48, a downstream end wall 49 and side walls 50, 51, and has a roof structure 52 comprising a top 53, an upstream end wall 54, and a downstream end wall 55. Between the roof structure 52 and the regulating barrier 44 is a chamber 56 which is represented in FIG. 3 only by a ceiling 57 and a side wall 58.

Inside the tank 46, heating means (not shown) maintain a hot zone 59 at the upstream end of the tank. The temperature decreases along the tank towards the downstream end, i.e., towards the cool zone 60. When the molten metal used is molten tin, the temperature gradient is, say, from 1000° C. near the upstream end wall 48, to 600° C. near the downstream end wall 49.

Above the surface of the bath 45 of metal at the cooler end portion of the tank there are four gas discharge conduits 61, 62a, 62b, 62c which extend transversely across the interior of the tank at different levels above the molten metal bath. The conduit 61, which is nearest the downstream end of the tank, is formed with apertures 63 which open in a horizontal direction towards the glass exit slot between the downstream end walls 49 and 55. Protective gas fed into this conduit thus serves to prevent ambient air from entering the tank through that slot. The conduits 62a, 62b, 62c are formed with apertures 64 which open horizontally towards the hotter end of the tank. The opposite ends of the gas discharge conduits are connected to distributors 66a, 66b via flow control valves 65a, 65b respectively. The distributors 66a, 66b are supplied with protective gas from reservoir 70 by the action of fans 68a, 68b having their intake pipes 69a, 69b connected to the supply reservoir 70 and their delivery pipes 67a, 67b connected to the distributors.

Above the surface of the molten metal bath 45 in the portion of the tank comprising the hot zone 59, are two groups of four pipes, 71a, 71b which extend through the side walls 50 and 51 respectively, so that the ends 71c, 71d of the pipes open into the tank interior. These pipes are fitted with valves 72a, 72b and their outer ends are connected to collectors 73a, 73b. Suction pipes 74a, 74b leading to suction fans 75a, 75b are connected to the collectors 73a, 73b, respectively, and protective gas is continuously drawn off from the hotter end portion of the tank by these fans and is discharged to atmosphere via discharge pipes 76a, 76b.

In the vicinity of the downstream end of the tank the sheet glass 77 is lifted off the bath of molten metal and conveyed by rollers 78 to an annealing lehr (not shown).

As compared with the embodiment of the invention described with reference to FIGS. 1 and 2, the embodiment according to FIGS. 3 and 4 enables the layer of glass to be cooled more intensely during its advance through the tank.

It will be understood that the above description of the present invention is susceptible to various modifications, changes, and adaptations, and the same are intended to be comprehended within the meaning and range of equivalents of the appended claims.

What is claimed is:

1. In a method wherein flat glass is formed on a bath of molten metal in a tank having a hotter end portion upstream of said tank and a cooler end portion downstream of said tank and through which tank the glass is advanced from said hotter end portion to said cooler end portion and cooled and in which the space above the molten bath is kept filled with a protective gas; the improvement comprising the steps of:
   (a) introducing substantially all of such protective gas into the tank at its cooler downstream end portion; and
   (b) removing substantially all of said protective gas from the hotter upstream end portion of said tank to produce a flow of protective gas from the cooler to the hotter end portions thereof.

2. A method according to claim 1 wherein the gas pressure above the molten bath in the hotter end portion is maintained above atmospheric pressure.

3. In an apparatus for manufacturing flat glass by the float process including a covered tank for holding a bath of molten metal to support a ribbon of glass, said tank having a cooler end portion, downstream of the tank and a hotter end portion upstream of the tank and means for advancing said glass through the tank from said hotter end portion to said cooler end portion and thereby cooling it, and means for keeping the tank space above the molten metal bath entirely filled with a protective gas, the improvement comprising means for introducing at least the greater portion of such protective gas into the tank at its cooler downstream end portion, and means for removing said protective gas from the hotter upstream end portion of said tank to produce a flow of protective gas from the cooler to the hotter end portions thereof, said means for introducing gas comprising at least one conduit for conducting protective gas into said cooler end portion of the tank and extending transversely across the interior of the tank in said cooler end portion thereof, said conduit having means defining peripheral orifices which open toward said hotter end portion for discharging the gas into the interior of the tank.

4. Apparatus as defined in claim 3 wherein said means defining gas discharge orifices open substantially horizontally.

References Cited

UNITED STATES PATENTS

| 2,280,306 | 5/1942 | Black | 65—119 |
| 3,337,320 | 8/1967 | Dyck | 65—32 |
| 3,356,476 | 12/1967 | Gulotta | 65—27 |

E. R. FREEDMAN, Assistant Examiner

S. LEON BASHORE, Primary Examiner

U.S. Cl. X.R.

65—32, 65, 99, 157, 168, 182